(12) United States Patent
Hawkins et al.

(10) Patent No.: US 9,412,067 B2
(45) Date of Patent: Aug. 9, 2016

(54) ANOMALY DETECTION IN SPATIAL AND TEMPORAL MEMORY SYSTEM

(71) Applicant: Numenta, Inc., Redwood City, CA (US)

(72) Inventors: Jeffrey C. Hawkins, Atherton, CA (US); Rahul Agarwal, San Francisco, CA (US)

(73) Assignee: Numenta, Inc., Redwood City, CA (US)

( * ) Notice: Subject to any disclaimer, the term of this patent is extended or adjusted under 35 U.S.C. 154(b) by 281 days.

(21) Appl. No.: 14/014,237

(22) Filed: Aug. 29, 2013

(65) Prior Publication Data

US 2014/0067734 A1    Mar. 6, 2014

Related U.S. Application Data

(60) Provisional application No. 61/697,239, filed on Sep. 5, 2012.

(51) Int. Cl.
*G06N 5/02* (2006.01)
*G06N 99/00* (2010.01)

(52) U.S. Cl.
CPC ............... *G06N 5/02* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 8,037,010 B2 | 10/2011 | Jaros et al. | |
| 8,332,348 B1 * | 12/2012 | Avery | 706/61 |
| 8,645,291 B2 | 2/2014 | Hawkins et al. | |
| 2011/0276828 A1 * | 11/2011 | Tamaki et al. | 714/26 |
| 2012/0137367 A1 * | 5/2012 | Dupont et al. | 726/25 |

OTHER PUBLICATIONS

Hawkins, J. "New Insights from Neuroscience & The Future of Intelligent Machines," *In Proceedings of the 39th International Symposium on Computer Architecture*, Jun. 9-13, 2012, twenty-eight pages, Portland, Oregon, USA.

* cited by examiner

*Primary Examiner* — Kakali Chaki
*Assistant Examiner* — Michael Zidanic
(74) *Attorney, Agent, or Firm* — Fenwick & West LLP (57) ABSTRACT

Detecting patterns and sequences associated with an anomaly in predictions made a predictive system. The predictive system makes predictions by learning spatial patterns and temporal sequences in an input data that change over time. As the input data is received, the predictive system generates a series of predictions based on the input data. Each prediction is compared with corresponding actual value or state. If the prediction does not match or deviates significantly from the actual value or state, an anomaly is identified for further analysis. A corresponding state or a series of states of the predictive system before or at the time of prediction are associated with the anomaly and stored. The anomaly can be detected by monitoring whether the predictive system is placed in the state or states that is the same or similar to the stored state or states.

21 Claims, 7 Drawing Sheets

ANOMALY DETECTION IN SPATIAL AND TEMPORAL MEMORY SYSTEM

CROSS-REFERENCE TO RELATED APPLICATION

This application claims priority under 35 U.S.C. §119(e) to U.S. Provisional Patent Application No. 61/697,239 filed on Sep. 5, 2012, which is incorporated by reference herein in its entirety.

BACKGROUND

1. Field of the Disclosure

The disclosure relates to detecting temporal sequences of spatial patterns associated with anomalies, and more specifically to comparing prediction made by a prediction system with an actual value or state to detect anomalies.

2. Description of the Related Arts

Predictive analytics refers to a variety of techniques for modeling and data mining current and past data sets to make predictions. Predictive analytics allows for the generation of predictive models by identifying patterns in the data sets. Generally, the predictive models establish relationships or correlations between various data fields in the data sets. Using the predictive models, a user can predict the outcome or characteristics of a transaction or event based on available data. For example, predictive models for credit scoring in financial services factor in a customer's credit history and data to predict the likeliness that the customer will default on a loan.

Commercially available products for predictive analytics include products from IBM SSPS, KXEN, FICO, TIBCO, Portrait, Angoss, and Predixion Software, just to name a few. These software products use one or more statistical techniques such as regression models, discrete choice models, time series models and other machine learning techniques to generate useful predictive models. These software products generate different predictive models having different accuracies and characteristics depending on, among others, the amount of training data and available resources.

With a perfect predictive model, all patterns and sequences should be predicted. Such predictive model will always make an accurate prediction; and hence, no anomaly in prediction will ever arise. In practice, however, predictive models are imperfect and the data is not always predictable. Hence, the prediction made using a predictive model will often deviate from the actual value or state being predicted. Some of such deviation may be indicative of critical events or errors that may pose a significant risk or advantage to a user of the predictive model.

SUMMARY

Embodiments are related to detecting an anomaly based on discrepancy between prediction made at one time by a predictive system and an actual value or state data corresponding to input data received at a subsequent time. At least a subset of states of the predictive system before the subsequent time is stored. An anomaly is detected by at least comparing the predicted value or state corresponding to the predictive output with an actual value or state at the subsequent time. The anomaly is associated with one or more stored states of the predictive system before the subsequent time.

In one embodiment, a request to detect a subsequent occurrence of the detected anomaly is received. In response, the predictive system is monitored to determine if the predictive system is placed in the one or more stored states associated with the anomaly.

In one embodiment, the anomaly is determined by tallying accuracy of predicted values or states corresponding to predictive outputs over a time period relative to actual values or states over a time period.

In one embodiment, the predictive system is configured to learn and detect temporal sequences of spatial patterns in the input data.

In one embodiment, the prediction output is generated using a series of spatial pooler outputs in sparse distributed representation by processing the input data over time by a spatial pooler. Each of the spatial pooler outputs indicates a spatial pattern detected in the input data at a time. The prediction output is generated by a sequence processor based on stored temporal relationships between the series of spatial pooler outputs.

In one embodiment, the subset of the states of the predictive system includes states of the sequence processor.

In one embodiment, the anomaly is determined by comparing the prediction output at one time with the spatial pooler output at a subsequent time.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements. Also in the figures, the left most digits of each reference number corresponds to the figure in which the reference number is first used.

Embodiments relate to detecting patterns and sequences associated with an anomaly in predictions made by a predictive system (e.g., a spatial and temporal memory system). The predictive system makes predictions by learning spatial patterns and temporal sequences in an input data that change over time. As the input data is received, the predictive system generates a series of predictions based on the input data. Each prediction based on the input data at a time represents a value or a state associated with the input data received at a subsequent time. Each prediction is compared with the corresponding actual value or state. If the prediction does not match or deviates significantly from the actual value or state, an anomaly is identified for further analysis. A corresponding state or a series of states of the predictive system before or at the time of prediction are associated with the anomaly and stored. The anomaly can be detected by monitoring whether the predictive system is placed in the state or states that is the same or similar to the stored state or states.

Architecture of Spatial and Temporal Memory System

A spatial and temporal memory system stores temporal relationships in sequences of spatial patterns and generates useful information based on the stored relationships. The useful information may include, for example, prediction of spatial patterns to be received, identification of spatial patterns or a higher level cause associated with the spatial patterns in an input data. The spatial and temporal memory system may be of a non-hierarchical structure or be of a hierarchical structure.

Figure 1A:
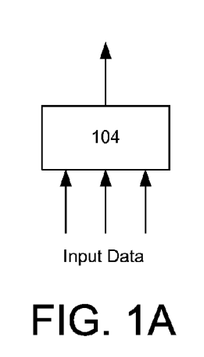
FIG. 1A is a conceptual diagram of a single processing node in a non-hierarchical system, according to one embodiment.

FIG. 1A is a conceptual diagram of a single processing node 104 in a non-hierarchical system, according to one embodiment. The processing node 104 receives input data, processes temporal sequences in the input data and generates an output. The output of the processing node 104 is based on the temporal relationships between spatial patterns. For example, the output may indicate prediction on subsequent spatial patterns to follow or indicate how well the prediction matched a subsequent spatial pattern in the input data.

Figure 1B:
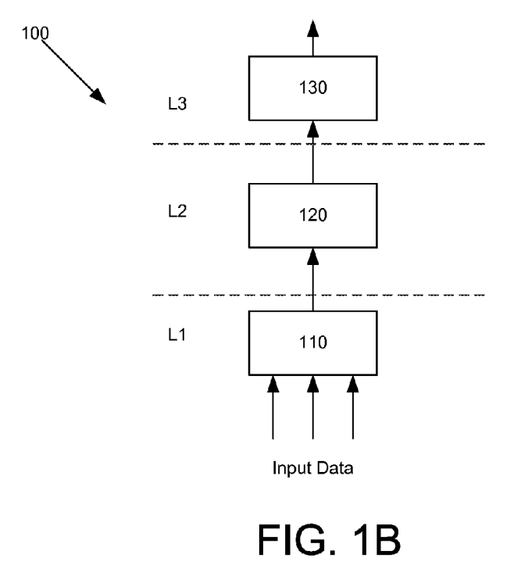
FIG. 1B is a conceptual diagram illustrating a hierarchical spatial and temporal memory system including three layers of processing nodes, according to one embodiment.

FIG. 1B is a conceptual diagram of processing nodes organized in a hierarchical manner, according to one embodiment. Such hierarchically structured spatial and temporal memory system is referred to as a Hierarchical Temporal Memory (HTM) system. In an HTM system, multiple processing nodes learn, predict and infer input at different levels of abstraction. An example HTM system 100 of FIG. 1B comprises three levels where each level L1, L2 and L3 includes one processing node 110, 120 and 130, respectively. HTM system 100 has three levels L1, L2, L3, with level L1 being the lowest level, level L3 being the highest level, and level L2 being an intermediate level between levels L1 and L3. Processing node 110 at the lowest level L1 receives a sensed input that changes over time. Processing node 110 processes the sensed input and outputs a signal that is fed to its parent node 120 at level L2. Processing node 120 at level L2 in turn processes the signal from processing node 120 and outputs a signal to processing node 130 at the highest level L3. Processing node 120 outputs a signal that represents likely causes or events associated with the input data.

Each processing node 110, 120, 130 may perform spatial pooling and/or temporal processing, as described below in detail with reference to FIG. 4. As a result, the output signals from each processing node 110, 120, 130 are more abstract or invariant over time compared to their input signals. In one embodiment, the top node 130 generates a final output of HTM system 100 that is of the highest abstraction (e.g., likely causes or events) among the outputs generated in HTM system 100. The final output may include distributions indicating likelihood that certain causes or events are associated with the sensed input.

Some of many functions performed by a processing node include, for example, spatial pooling and temporal processing. The spatial pooling herein refers to the process of mapping a set of distinct but similar spatial patterns into a spatial co-occurrence. The temporal processing may include, but is not limited to, learning temporal sequences, performing inference, recognizing temporal sequences, predicting next elements in temporal sequences, labeling temporal sequences and temporal pooling. The learning of temporal sequences herein refers to one or more of initializing, expanding, contracting, merging and splitting temporal sequences. The prediction herein refers to assessing likelihood that certain spatial patterns will appear subsequently in the input data. The temporal pooling herein refers to processing input data to provide an output that is more stable and invariable over time compared to spatial patterns in the input data. Hardware, software, firmware or a combination thereof for performing the spatial pooling is hereinafter referred to as a spatial pooler. Hardware, software, firmware or a combination thereof for performing the temporal processing is hereinafter referred to as a sequence processor. The sequence processor may perform one or more of learning temporal sequences, performing inference, recognizing temporal sequences, predicting temporal sequences, labeling temporal sequences and temporal pooling.

In one embodiment, a processing node includes only a sequence processor or the spatial pooler. For example, nodes at the first level of the HTM system may consist of processing nodes having only spatial poolers, and the nodes at the second level of the HTM system may consist of processing nodes having only sequence processors. Processing nodes performing other functions (e.g., filtering) may also be placed within the HTM system. Alternatively, a processing node may include two or more levels of interconnected sequence processors or spatial poolers.

Figure 2:
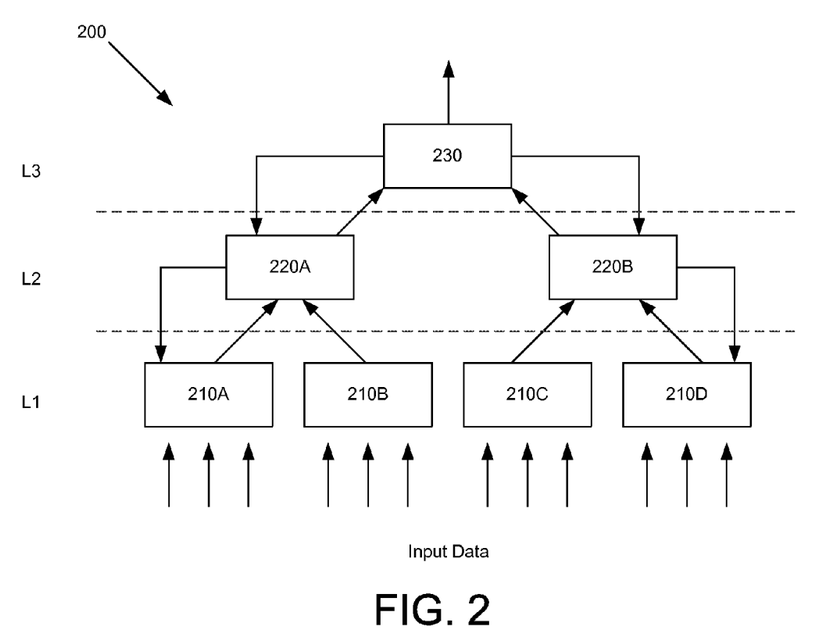
FIG. 2 is a conceptual diagram illustrating a hierarchical spatial and temporal memory system with multiple processing nodes at lower levels, according to one embodiment.

The processing nodes of the HTM system may be arranged so that the number of processing nodes decreases as level increases. FIG. 2 is a diagram illustrating HTM system 200 having three levels L1, L2, L3, with level L1 being the lowest level, level L3 being the highest level, and level L2 being an intermediate level between levels L1 and L3. HTM system 200 is hierarchically structured so that the processing nodes cover a larger input space as the level ascends. Level L1 has nodes 210A, 210B, 210C and 210D; level L2 has nodes 220A and 220B; and level L3 has node 230. Nodes 210A, 210B, 210C, 210D, 220A, 220B, and 230 are hierarchically connected in a tree-like structure such that each processing node has several children nodes (that is, nodes connected at a lower level) and one parent node (that is, node connected at a higher level).

Further, HTM system 200 propagates bottom-up signals up the hierarchy as well as propagates top-down signals down the hierarchy. That is, each processing node 210A, 210B, 210C, 210D, 220A, 220B, and 230 may be arranged to (i) propagate information up the HTM hierarchy to a connected parent node, and (ii) propagate information down the HTM hierarchy to any connected children nodes.

The number of levels or arrangement of processing modes in FIGS. 1 and 2 are merely illustrative. Many variants of HTM system may be developed and deployed depending on the specific application. For example, the number of levels may be increased to provide different levels of abstraction/invariance or to accommodate different types of sensed inputs (e.g., visual data and audio data). Further, a parent node may also receive partially overlapping bottom-up signals from multiple children nodes. An external supervision signal may also be fed to each of the processing nodes to enhance spatial and/or temporal processing performance.

In one embodiment, one or more nodes of the spatial and temporal memory system receives sensed inputs representing images, videos, audio signals, sensor signals, data related to network traffic, server and application metrics, financial transaction data, communication signals (e.g., emails, text messages and instant messages), documents, insurance records, biometric information, parameters for manufacturing process (e.g., semiconductor fabrication parameters), inventory patterns, energy or power usage patterns, data representing genes, results of scientific experiments or parameters associated with operation of a machine (e.g., vehicle operation) and medical treatment data. The spatial and temporal memory system may process such inputs and produce an output representing, among others, identification of objects shown in an image, identification of recognized gestures, classification of digital images as pornographic or non-pornographic, identification of email messages as unsolicited bulk email ('spam') or legitimate email ('non-spam'), prediction of a trend in financial market, prediction of failures in a large-scale power system, identification of a speaker in an audio recording, classification of loan applicants as good or bad credit risks, identification of network traffic as malicious or benign, identity of a person appearing in the image, processed natural language processing, weather forecast results, patterns of a person's behavior, control signals for machines (e.g., automatic vehicle navigation), gene expression and protein interactions, analytic information on access to resources on a network, parameters for optimizing a manufacturing process, predicted inventory, predicted energy usage in a building or facility, web analytics (e.g., predicting which link or advertisement that users are likely to click), identification of anomalous patterns in insurance records, prediction on results of experiments, detecting anomalous patterns in server metrics, indication of illness that a person is likely to experience, selection of contents that may be of interest to a user, indication on prediction of a person's behavior (e.g., ticket purchase, no-show behavior), prediction on election, prediction/detection of adverse events, a string of texts in the image, indication representing topic in text, and a summary of text or prediction on reaction to medical treatments. The underlying representation (e.g., photo, audio and etc.) can be stored in a non-transitory storage medium.

Example Structure and Operation of Processing Node

Figure 3:
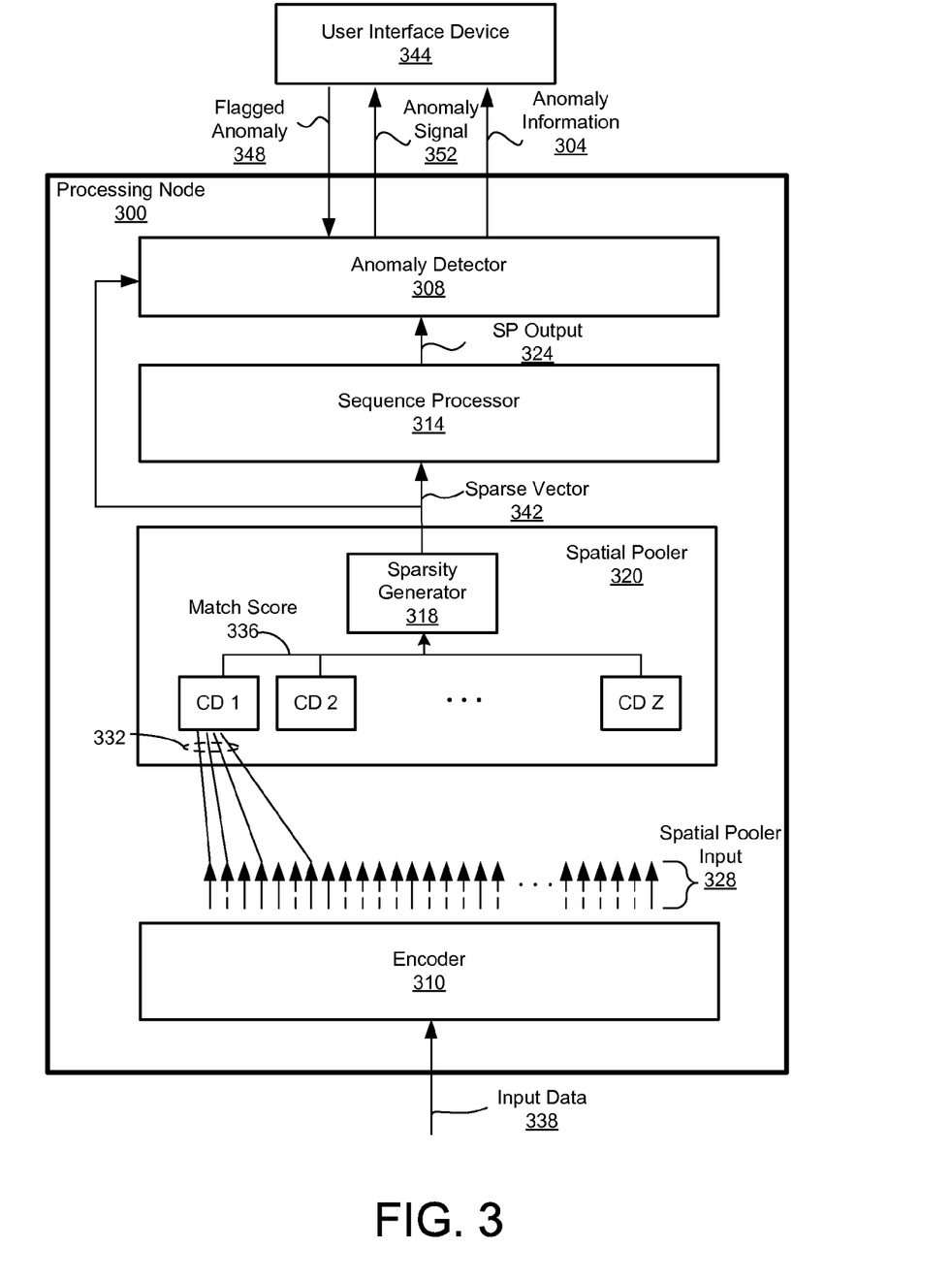
FIG. 3 is a block diagram illustrating a processing node and a user interface device, according to one embodiment.

FIG. 3 is a block diagram illustrating processing node 300 and user interface device 344 in a spatial and temporal memory system, according to one embodiment. The processing node 300 may be a stand-alone node for operating without other processing nodes. Alternatively, the processing node 300 may be part of a hierarchy of processing nodes, for example, as described above in detail with reference to FIGS. 1B and 2.

User interface device 344 communicates with processing node 300 to monitor and configure the operation of processing node 300. User interface device 344 may be hardware, software, firmware or a combination thereof that allows a user to view anomaly information 304 received from processing node 300. The user interface device 344 also flags one or more anomalies as being of significance or interest to the user based on the anomaly information 304. The user interface device 344 may be embodied as a computing device that includes at least a processor and memory.

In one embodiment, the user interface device 344 stores anomaly information 304 associated with anomaly candidates for a certain period of time (e.g., a day or a week). The user may later investigate events and predictions over such period in a batch and flag all or a subset of anomalies for future detection.

Processing node 300 may include, among other components, anomaly detector 308, sequence processor 314, spatial pooler 320 and encoder 310. Encoder 310 receives input data 338 and encodes the input data 338 into spatial pooler input 328 suitable for further processing at processing node 300 using various types of encoding schemes, as described, for example in U.S. patent application Ser. No. 13/218,170, entitled "Encoding of Data for Processing in a Spatial and Temporal Memory System," filed on Aug. 25, 2011, which is incorporated by reference herein in its entirety. If the processing node 300 forms a non-hierarchical system or is a lowest node of a hierarchical system, the input data 338 may be sensed input. If the processing node 300 is a node at intermediate level or a top level of a hierarchical system, the input data 338 may be an output from a child node or children nodes.

Spatial pooler 320 performs spatial pooling by producing sparse vector 342 in sparse distributed representation. In sparse distributed representation, a majority of elements in the sparse vector 342 are inactive (e.g., assigned a value of zero) while the remaining elements are active (e.g., assigned a value of one). Referring to FIG. 3, spatial pooler 320 includes, among other components, a sparsity generator 318 and a plurality of co-occurrence detectors (CDs) 1 through Z. CDs detect co-occurrences in spatial pooler input 328, and generate match scores 336. Match scores 336 indicate the degree of match between a spatial pattern of the spatial pooler input 328 and a co-occurrence pattern associated with each CD. In one embodiment, a higher match score indicates more overlap between spatial pooler input 328 and the associated co-occurrence pattern of each CD. The match scores 336 are provided to sparsity generator 318. In response, sparsity generator 318 generates sparse vector 342 in sparse distributed representation.

In one embodiment, each CD is mapped to a subset of elements in the spatial pooler input 328 within predefined input space. As illustrated in FIG. 3 by lines extending from CD 1 to a subset of arrows of spatial pooler input 328, CD 1 is mapped to receive a subset of elements of the spatial pooler input 328. Similarly, CD 2 is mapped to receive a subset of elements of the spatial pooler input 328 (not shown).

Sparsity generator 318 collects the match scores 336 from the CDs, selects a number of CDs satisfying conditions based on their match scores and match scores of nearby CDs to generate sparse vector 342. In one embodiment, when a CD becomes dominant (i.e., the CD has a high match score), the CD inhibits selection of other CDs within a predetermined range (hereinafter referred to as "an inhibition range"). The inhibition range may extend only to CDs immediately adjacent to the dominant CD or may extend to CDs that are separated from the dominant CD by a predetermined distance. Alternatively, sparsity generator 318 may select a subset of CDs with highest match scores among all CDs in the processing node.

Sequence processor 314 performs temporal processing based on sparse vector 342, and generates sequence processor (SP) output 324. SP output 324 represents activation state of columns, cells and/or matching of entries in the tables of the cells in the sequence processor 314, as described below in detail with FIGS. 4A and 4B. The SP output 324 indicates predictive activation of cells as well as current activation of cells, as described below in detail with reference to FIG. 4A.

Anomaly detector 308 detects anomalies for further analysis and also monitors the state of the sequence processor 314 for anomalies flagged as being of interest or significance. Anomaly detector 308 may perform one or more of the following functions: (i) track accuracy of prediction and the internal states of sequence processor 314, (ii) determine that a prediction is associated with an anomaly if the prediction deviates from an actual value or state, (iii) identify the states of the sequence processor 314 that appeared before or at the time that flagged anomalies occurred, and (iv) monitor the state of the sequence processor 314 to detect the flagged anomalies, as described below in detail with reference to FIG. 5.

Figure 4A:
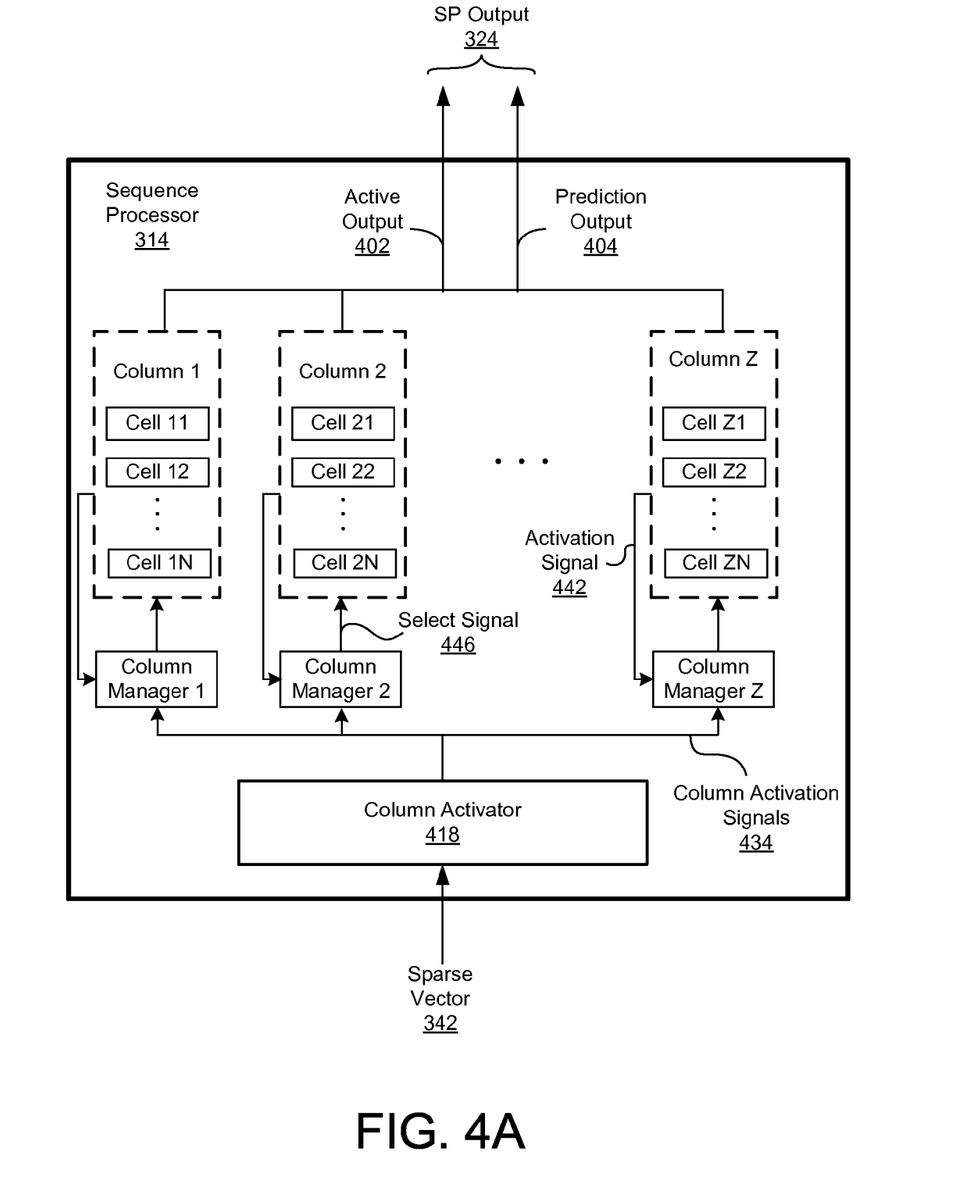
FIG. 4A is a block diagram illustrating a sequence processor in a processing node, according to one embodiment.

FIG. 4A is a block diagram illustrating sequence processor 314, according to one embodiment. Sequence processor 314 learns and stores transitions between spatial patterns represented as sparse vector 342 by establishing connections between cells and, for each cell, storing activation states of other connected cells that precede its activation. Based on the learned transitions, sequence processor 314 recognizes and predicts the same or similar transitions in the input signal by monitoring the activation states of its cells.

Sequence processor 314 may include, among other components, columns of cells (in dashed boxes), column managers and column activator 418. Column activator 418 receives sparse vector 342 from spatial pooler 320. In response, column activator 418 generates column activation signals 434 indicating which columns are to be activated based on sparse vector 342. The column activator 418 receives sparse vector 342 and determines which elements of sparse vector 342 are active. Then, column activator 418 sends column activation signals 434 to corresponding columns to activate cells in these columns. Each column is connected to an associated column manager. The column manager receives the column activation signal 434, determines activation states of cells in the column (based on activation signal 442), and sends select signal 446 to activate one or more cells in the column under certain circumstances.

In one embodiment, sequence processor 314 may learn, store and detect temporal sequences while performing inference, prediction or other temporal processing (also referred to as "online learning" herein). The online learning collapses a learning (or training) phase and a temporal processing (e.g., predicting) phase into a single phase.

Example embodiments of processing node 300 described above with reference to FIGS. 3 and 4A are merely illustrative. Other types of processing nodes using different algorithm or operating principle may be adopted in spatial and temporal memory system. For example, a processing node may implement an algorithm described, for example, in U.S. Pat. No. 8,037,010, entitled "Spatio-Temporal Learning Algorithms in Hierarchical Temporal Networks," issued on Oct. 11, 2011, which is incorporated by reference herein in its entirety.

Example Structure of Cells

One or more cells are included in each column. The cells may be activated by select signals 446 at the current time step (hereinafter referred to as "non-predictive" activation) or by receiving sequence inputs from other connected cells (hereinafter referred to as "predictive" activation). The sequence inputs represent the activation states of cells in columns other than the column in which a particular cell belongs, and can be used to activate the particular cell based on the activation of cells in the other columns. The cells individually, or collectively as a column, send active output 402 and prediction output 404 as SP output 324 to anomaly detector 308.

Figure 4B:
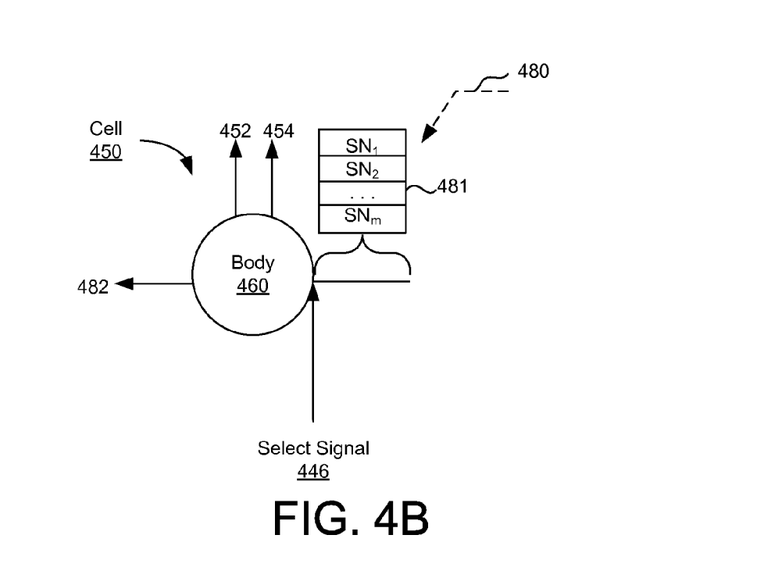
FIG. 4B is a conceptual diagram illustrating a structure of a cell, according to one embodiment.

FIG. 4B is a conceptual diagram illustrating signals associated with a cell 450, according to one embodiment. Cell 450 receives sequence inputs 480 and select signal 446. Sequence inputs 480 are collective sequence outputs sent out by other cells having connections with cell 450. Cell 450 establishes connections with the other cells during learning to monitor the activation states of the other cells. Cell 450 also receives select signal 446 which becomes active when: (i) the column including cell 450 is activated by column activation signal 434, and (ii) cell 450 is selected to learn activation states of other cells. After activation, cell 450 also sends a sequence output 482 to other cells. The sequence output 482 in conjunction with the sequence output from other cells form sequence inputs for other cells.

Cell 450 generates non-predictive cell output 452 and predictive cell output 454. Non-predictive cell output 452 is generated when the cell 450 is activated in response to select signal 446 (which is in turn generated in response to column activation signals 434). Non-predictive cell output 452 in conjunction with non-predictive cell outputs from other cells form active output 402 representing non-predictive activation of cells at a current time step. Predictive cell output 454 is generated when the cell 450 is activated in response to sequence inputs 480. Predictive cell output 454 in conjunction with predictive cell outputs from other cells form prediction output 404 representing predictive activation of cells based on the sequence inputs.

Cell 450 includes a table 481 storing sets of activation states upon activation of cell 450. Each of the entries $SN_1$ through $SN_m$ correspond to a set of activation state of cells connected to cell 450 when cell 450 was activated. When the sequence inputs 480 indicate activation states of other cells that match totally or partially with one set of activation states as stored in an entry of table 481, cell body 460 outputs predictive cell output 454.

In one embodiment, entries in table 481 store identifications of a subset of cells active when cell 450 was first activated. The five cells may be a subset of fifty cells that were active when cell 450 was activated. The cells for storing information about the vector may be selected randomly or based on certain criteria.

As multiple vectors are detected, a list of vectors may be generated for the selected cell. After learning, the cell is activated when sequence input includes a vector completely matches to one of the list of vectors that the cell is storing or the number/percentage of elements matching the list of vectors exceed a threshold.

Example Anomaly Detector

An anomaly described herein refers an event where a prediction of the spatial and temporal memory system does not coincide or significantly deviates from the actual value or state. The anomaly may indicate a condition or state of significance or interest to a user. For example, certain anomalies may indicate that a system is likely to experience a major malfunction or the system is not operating at an optimal condition. Alternatively, the anomaly may simply be caused by insufficient number of training data or deficiency in the predictive model. Such deficiency may be rectified by training the spatial and temporal memory system with more data. After further training, the spatial and temporal memory system may no longer generate the same anomaly when exposed to the same or similar patterns or sequences that previously resulted in an anomaly.

To determine whether the anomaly is of significance/interest or whether it is merely due to defective predictive modeling, a further analysis may be needed. Such analysis may be time-consuming and may render real-time determination on the significance of the anomaly impracticable or impossible. Hence, in one embodiment, the anomaly and related information is stored for subsequent analysis. The related information may include, for example, the time when the anomaly occurred and the internal state or states of processing nodes (e.g., predictive activation of cells and non-predictive activation of cells) before the anomaly occurred, the degree of deviation of the prediction from the actual value or state, and other information for recordkeeping.

Figure 5:
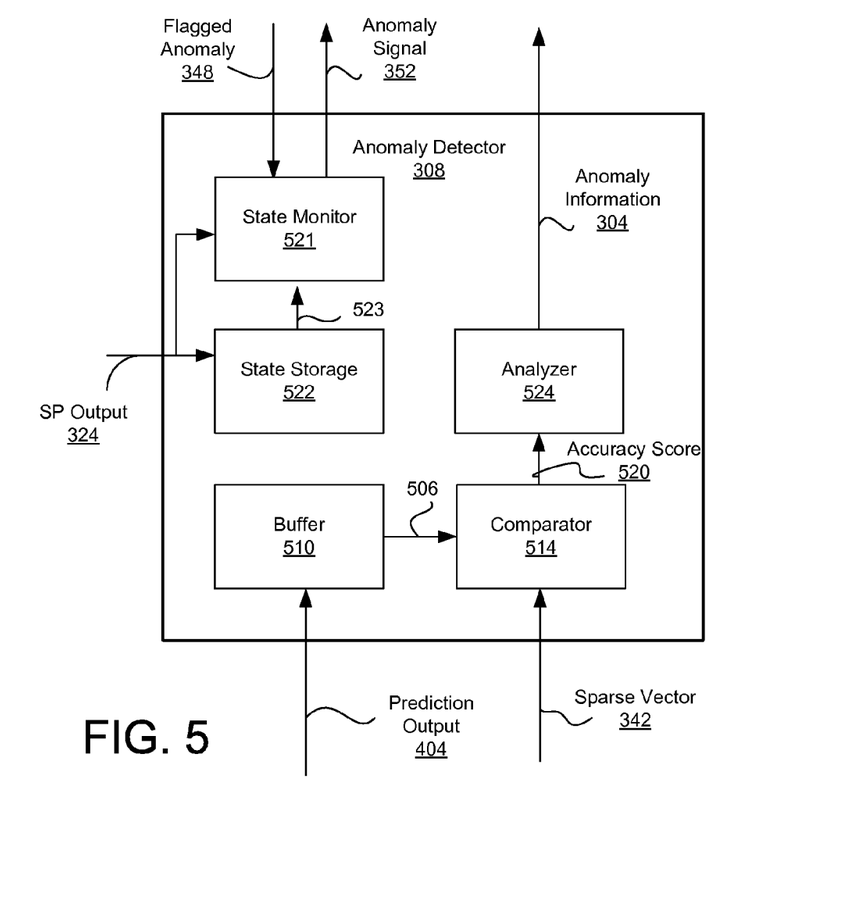
FIG. 5 is a block diagram illustrating an anomaly detector of the processing node, according to one embodiment.

FIG. 5 is a block diagram illustrating anomaly detector 308 of the processing node 300, according to one embodiment. Anomaly detector 308 receives prediction output 404 as the prediction of the processing node 300 and sparse vector 342 as the actual value or state. Anomaly detector 308 compares prediction output 404 with subsequent sparse vector 342 to detect an anomaly. After detecting an anomaly, anomaly detector 308 sends anomaly information 304 to user interface device 344 for further analysis. If the anomaly is confirmed as being of significance or interest after further analysis, anomaly detector 308 receives flagged anomaly 348 from user interface device 344 indicating that the corresponding anomaly is of significance or interest and should be detected in the future.

Anomaly detector 308 may include, among other components, state monitor 521, anomaly storage 522, analyzer 524, buffer 510 and comparator 514. Buffer 510 is hardware, software, firmware or a combination thereof for receiving and storing prediction output 404. Prediction output 404 is stored temporarily in buffer 510 and sent to comparator 514 as buffered prediction 506 for comparison with sparse vector 342 received subsequent to prediction output 404.

Comparator 514 compares buffered prediction 506 with sparse vector 342 to determine the accuracy of the prediction. The accuracy of the prediction may be determined by difference in bits of the buffered prediction 506 and sparse vector 342. Alternatively, comparator 514 may include a decoder for computing a value corresponding to sparse vector 342 and another value corresponding to buffered prediction 506. The two decoded values may then be compared to determine the accuracy. Also, input data 338 (instead of sparse vector 342) may be compared with the value decoded from the buffered prediction 506 to determine the accuracy of the prediction. Comparator 514 generates accuracy score 520 indicating the accuracy of prediction output 404 relative to sparse vector 342. In one embodiment, a higher accuracy score 520 indicates higher accuracy of the prediction.

Analyzer 524 receives accuracy score 520 and determines if anomalies have occurred based on accuracy score 520. In one embodiment, analyzer 524 tallies accuracy score 520 over a time window covering multiple time steps. If the tallied score indicates inaccurate prediction over the multiple time steps, analyzer 524 determines that an anomaly has occurred and sends anomaly information 304 to user interface device 344. For example, if the average of the accuracy scores over the time window drops below a threshold, analyzer 524 determines that the anomaly has occurred. Various functions (e.g., weighted functions) other than averaging of the accuracy scores may be used to determine the occurrence of an anomaly. Further, depending on the accuracy of the predictive model as implemented by processing node 300, the length of the time window can be increased or decreased dynamically. If the prediction of the processing node 300 tends to be accurate, a shorter time window can be used.

Anomaly information 304 includes information that can be used later to identify time steps, input data 338, or the internal state of sequence processor 314 associated with the anomaly. Anomaly information 304 may include information indicating the accuracy scores 520 over multiple time steps, unusual changes in input data 338 or other information that could facilitate manual or automatic evaluation of the anomaly at user interface device 344. In one embodiment, anomaly information 304 includes an index that enables identification of associated states of sequence processor 314 stored in state storage 522.

Anomaly information 304 is received at user interface device 344 and stored for further analysis. Such analysis may be performed in batches (e.g., once a day or once a week). The analysis may include retrieving states of the sequence processor 314 in the form of SP outputs 324 received in a predetermined time frame preceding the anomaly and/or at the time of anomaly. To make SP output 324 available for analysis at a later time, state storage 522 receives and stores SP output 324. If further analysis indicates that the anomaly is of significance or interest, one or more states of the sequence processor 314 associated with the anomaly can be retrieved using, for example, the index stored in corresponding anomaly information 304.

In contrast, if further analysis indicates that the anomaly is not of significance or interest, the corresponding anomaly information 304 is discarded. If processing node 300 was operating in an on-line learning mode or retrained using spatial patterns and temporal sequences associated with the anomaly, processing node 300 may have learned these patterns and sequences and thereby produce more accurate prediction when the same or similar spatial patterns and temporal sequences are later encountered. That is, processing node 300 may incorporate spatial patterns and temporal sequences associated with the anomaly in its learning. Accordingly, the spatial patterns and temporal sequences that previously resulted in an anomaly may no longer result in an anomaly due to more accurate prediction.

State storage 522 receives and stores SP output 523 for later retrieval and processing. SP output 324 represents the internal state of sequence processor 314 in the form of activation states of cells in sequence processor 314. As set forth above with reference to FIG. 4A, SP output 324 includes active output 402 and prediction output 404. In one embodiment, the state storage 522 indexes SP output 324 based on time stamps or other criteria. SP output 523 stored in state storage 522 may be accessed by state monitor 521 and/or user interface device 344 based on these indexes. In one embodiment, the stored SP outputs 523 that are not associated with any flagged anomalies are periodically flushed to make space for storage of subsequent SP outputs 324.

State monitor 521 stores the state information associated with anomalies flagged after further analysis and issues anomaly signal 352 when sequence processor 314 is placed in a state associated with the flagged anomalies or undergoes a series of states associated with the flagged anomalies. When a certain anomaly is determined as being of significance or interest, user interface device 344 sends information about flagged anomaly 348 to state monitor 521. After receiving flagged anomaly 348, state monitor 521 retrieves one or more SP outputs 324 received before or at the time the anomaly occurred. If the current SP output 324 or a series of SP output 324 over time matches or is similar to the retrieved SP output(s) 523, state monitor 521 issues anomaly signal 352 indicating that the anomaly flagged by the user has occurred or is about to occur. In one embodiment, the similarity between the stored SP output 523 and the current SP output 324 can be determined by the number of matching bits.

In one embodiment, user interface device 344 alerts the user of the flagged anomaly after receiving anomaly signal 352 from state monitor 521. In response, the user can take actions in anticipation of the flagged anomaly.

Although the embodiment of FIG. 5 is described above as storing and comparing cell activations states as the internal state of the sequence processor 314, information of finer or coarse granularity can also be stored and compared to detect anomalies. For example, activation states of columns may be used instead of cell activation states as a coarser unit of information for detecting the anomalies. Also, an entry of a table in the cell matching sequence inputs and causing a cell to activate may be used as a finer unit of information for detecting the anomalies.

Example Process of Detecting Anomalies

Figure 6:
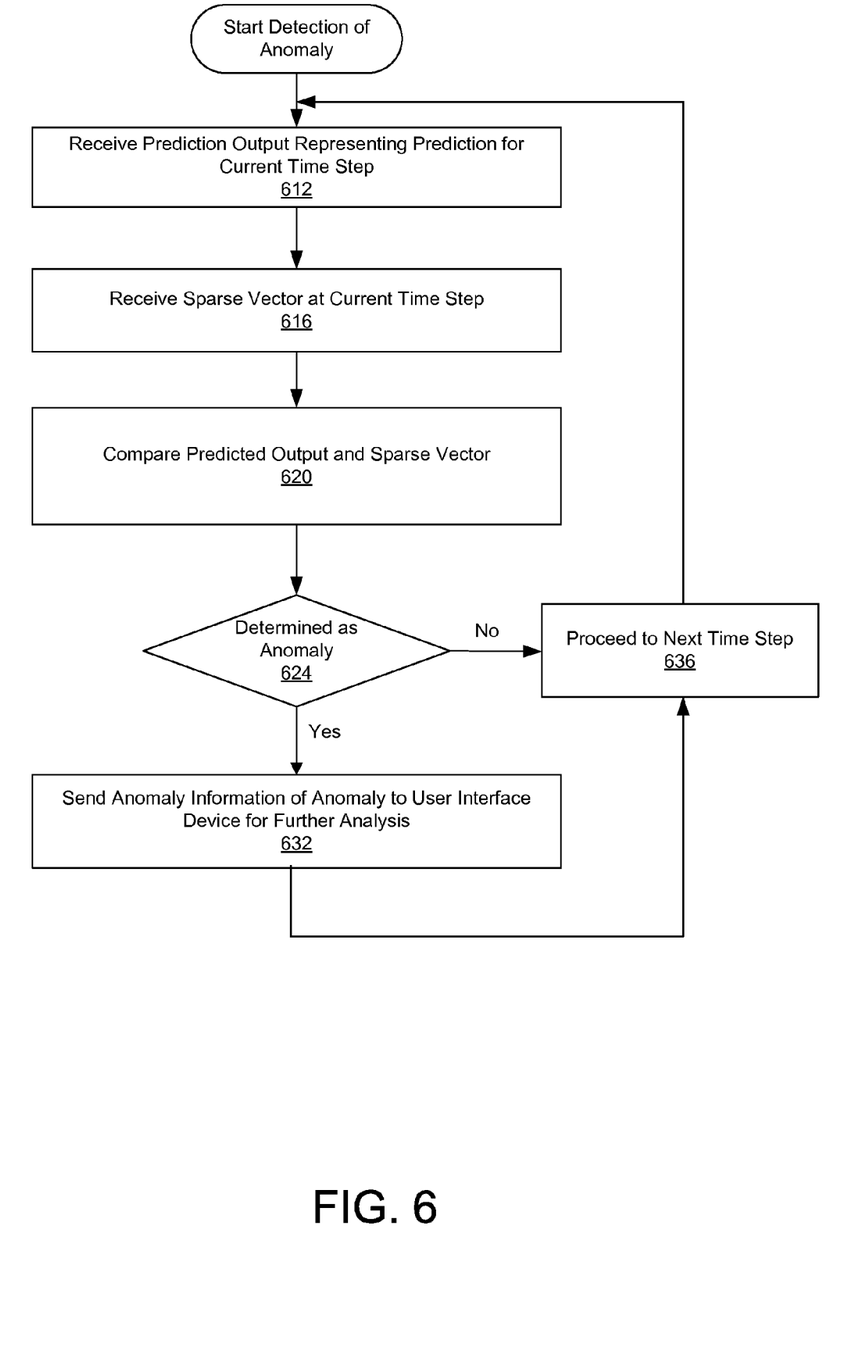
FIG. 6 is a flowchart illustrating detection of an anomaly for further analysis, according to one embodiment.

FIG. 6 is a flowchart illustrating a process of detecting an anomaly for further analysis, according to one embodiment. Anomaly detector 308 receives 612 prediction output 404 based on input data received a time step before the current time step. In one embodiment, prediction output 404 represents predicted sparse vector 342 for the current time step.

Anomaly detector 308 also receives 616 sparse vector 342 for the current time step from spatial pooler 320. Predicted output 404 representing the predicted sparse vector for the current time step is then compared 620 with sparse vector 342. Based on the difference between predicted output 404 and sparse vector 342, it is determined 624 whether an anomaly has occurred. In one embodiment, the anomaly is detected when an average of accuracy scores indicating the match between predicted output 404 and sparse vector 342 over multiple time steps indicate substantial discrepancy of the predicted output 404 from sparse vector 342 over the multiple time steps.

If no anomaly is detected, the process proceeds 636 to a next time step and returns to receiving 612 predicted output to repeat the subsequent steps.

If an anomaly is detected, anomaly information of the detected anomaly is sent 632 to user interface device 344 for further analysis. Then, the process proceeds 636 to the next time steps and returns to receiving 612 predicted output to repeat the subsequent steps.

The sequence of steps in FIG. 6 can be modified. For example, receiving prediction output 404 generated at a prior time step and receiving 616 spare vector 342 of the current time step can be performed in a reverse sequence or in parallel. Further, some steps illustrated in FIG. 6 may be omitted. For example, sending 632 anomaly information to user interface device 344 may be omitted. Instead, further analysis may be performed at anomaly detector 308 to identify and flag anomalies of significance or interest.

Figure 7:
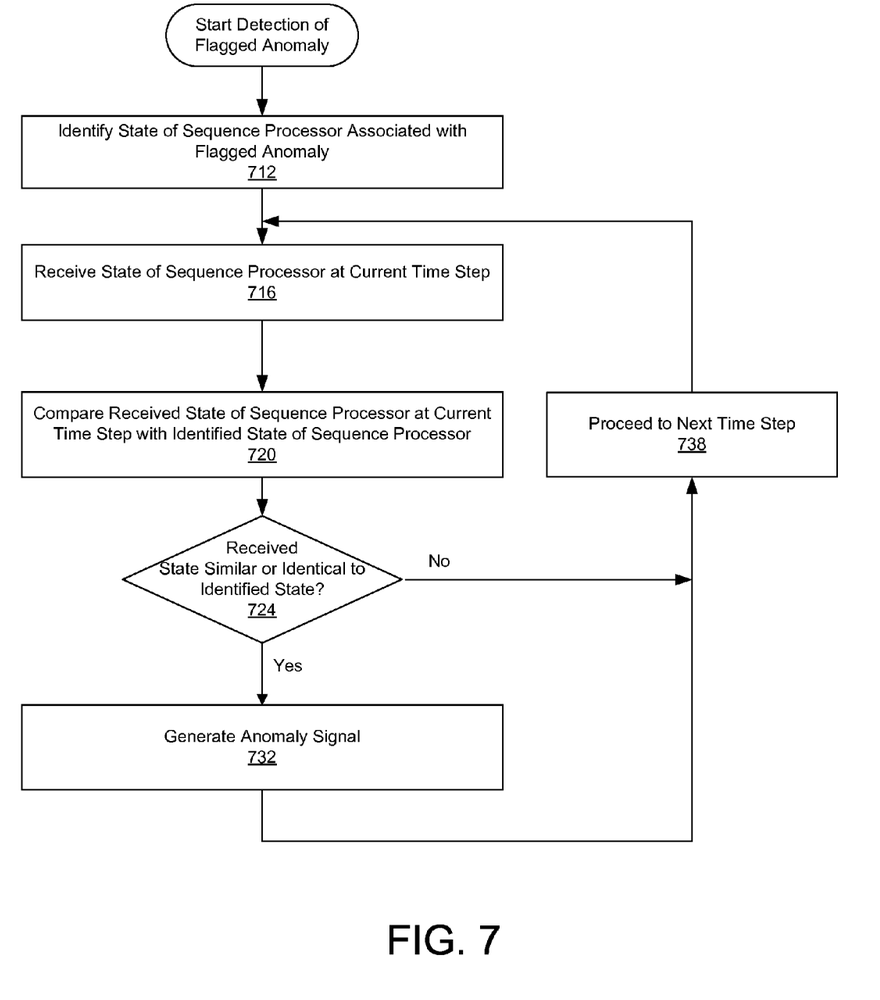
FIG. 7 is a flowchart illustrating a process of detecting a flagged anomaly in input data, according to one embodiment.

FIG. 7 is a flowchart illustrating a process of detecting a flagged anomaly in input data 338, according to one embodiment. After receiving information about flagged anomaly 348, the state of sequence processor 314 before or at the time of the flagged anomaly is identified 712. The state of sequence processor 314 may be SP output 324 from sequence processor 314 indicating the activation states of cells in sequence processor 314 before or at the time the anomaly was detected in the process described above with reference to FIG. 6.

The state of sequence processor 314 at the current times step is received 716 at anomaly detector 308. The received state of sequence processor 314 at the current time step is then compared with the identified state of the sequence processor 314 before or at the time of the flagged anomaly. If it is determined 724 that the two states are not similar or identical, then the process proceeds 738 to the next time step and repeats receiving 718 the state of sequence processor 314 at the next time step and subsequent steps without generating anomaly signal 352.

Conversely, if the two states are similar or identical, anomaly signal 732 is generated to alert the user and then proceeds 738 to the next time step to repeat receiving 718 the state of sequence processor 314 at the next time step and subsequent steps.

In one embodiment, instead of comparing a single state of the sequence processor at a current time with a single state of the sequence processor 314 identified as being associated with a flagged anomaly, a series of states of the sequence processor 314 received at multiple times are compared with a series of identified states of the sequence processor 314 are compared. Anomaly detector 308 then determines that a flagged anomaly has occurred or is about to occur when all or a certain percentage of states match or are similar to the identified states of the sequence processor 314. For example, two SP outputs each appearing one time step and two time steps before a flagged event occurred are identified as being associated with the flagged event. Anomaly detector 308 may determine that the flagged event is about to occur only when the same two SP outputs are later received in series. In this way, the likelihood of false alarms can be reduced and the flagged anomaly can be detected more accurately.

Also, multiple flagged anomalies may be detected by identifying multiple states or multiple series of states of sequence processor 314, each associated with a flagged anomaly, and then generating anomaly signal 352 when the state or series of states of the sequence processor 314 at the current time step are similar to or identical to any of the identified states of the sequence processor.

Example of Using Multiple Processing Nodes

Figure 8:
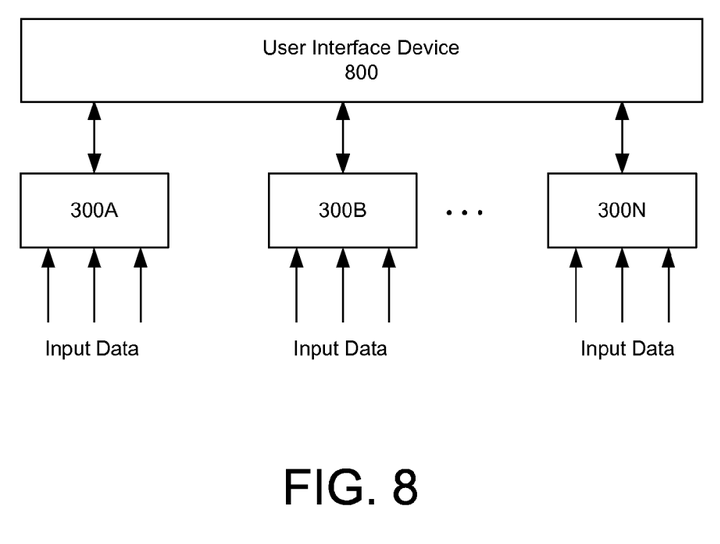
FIG. 8 is a block diagram illustrating using a plurality of predictive systems to detect different anomalies, according to one embodiment.

FIG. 8 is a block diagram illustrating using a plurality of predictive systems to detect different anomalies, according to one embodiment. A plurality of predictive systems may be embodied using multiple processing nodes 300A through 300N to detect different anomalies in the input data. By using different parameters or configurations for each processing nodes 300A through 300N, each of the processing nodes 300A through 300N may embody a different predictive system capable of detecting different anomalies. At least one of the processing nodes 300A through 300N may include a spatial pooler and a sequence processor as illustrated in FIG. 3, while other processing nodes may use different algorithm and construction to generate outputs representing predictions.

A user interface device 800 may communicate with each of the processing nodes 300A through 300N to receive anomaly information 304 and also send flagged anomaly 348 to indicate the anomalies to be subsequently monitored. If one or more of the processing nodes 300A through 300N are not useful in generating useful prediction outputs or anomalies, the user interface device 800 may cause such processing nodes to be discarded. In place of the discarded processing nodes, additional processing nodes with different operating parameters and configuration may be deployed.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

The invention claimed is:

1. A method of detecting anomaly in a predictive system, comprising:
    changing from a prior state of the predictive system to an updated state of the predictive system according to an input data received at a first time by at least activating or deactivating cells of the predictive system, the prior state of the predictive system indicating at least activation states of the cells before receiving the input data at the first time, the updated state of the predictive system indicating at least the activation states of the cells after receiving the input data at the first time;
    generating a prediction output by the predictive system by at least detecting the cells that are activated after receiving the input data at the first time, the prediction output representing a predicted value or state at a second time subsequent to the first time;
    storing at least the updated state of the predictive system;
    determining presence of an anomaly associated with the input data by at least comparing the predicted value or state corresponding to the predictive output with an actual value or state at the second time; and
    associating the anomaly with the stored state of the predictive system.

2. The method of claim 1, further comprising receiving a request to detect a subsequent occurrence of the anomaly.

3. The method of claim 2, further comprising monitoring the predictive system to detect an occurrence of the stored state of the predictive system associated with the anomaly at a third time subsequent to the second time responsive to receiving the request.

4. The method of claim 3, further comprising detecting an occurrence of an event associated with the anomaly responsive to detecting the occurrence of the stored state of the predictive system associated with the anomaly.

5. The method of claim 2, wherein determining the anomaly comprises comparing tallying accuracy of predicted values or states corresponding to predictive outputs over a first time period including the first time relative to actual values or states over a second time period including the second time.

6. The method of claim 1, wherein the predictive system is configured to learn and detect temporal sequences of spatial patterns in the input data by activating or deactivating the cells.

7. The method of claim 1, generating the prediction output comprises:
    generating a series of spatial pooler outputs in sparse distributed representation by processing the input data over time by a spatial pooler, each of the spatial pooler outputs indicating a spatial pattern detected in the input data at a time; and
    generating, by a sequence processor, the prediction output by a least activating or deactivating the cells to represent stored temporal relationships between the series of spatial pooler outputs.

8. The method of claim 7, wherein the prior state and the updated state of the predictive system comprises states of the cells in the sequence processor.

9. The method of claim 7, wherein determining the anomaly comprises comparing the prediction output at the first time with the spatial pooler output at the second time.

10. The method of claim 1, wherein detecting the anomaly comprises determining whether the predicted value or state deviates from the actual value or state above at the second time beyond a threshold difference.

11. A non-transitory computer-readable storage medium storing instructions thereon, the instructions when executed by a processor causing the processor to:
    change from a prior state of a predictive system to an updated state of the predictive system according to an input data received at a first time by at least activating or deactivating cells of the predictive system, the prior state of the predictive system indicating at least activation states of the cells before receiving the input data at the first time, the updated state of the predictive system indicating at least the activation states of the cells after receiving the input data at the first time;
    generate a prediction output by a predictive system by at least detecting the cells that are activated after receiving the input data at the first time, the prediction output representing a predicted value or state at a second time subsequent to the first time;
    store at least the updated state of the predictive system;
    determine presence of an anomaly associated with the input data by at least comparing the predicted value or state corresponding to the predictive output with an actual value or state at the second time; and
    associate the anomaly with the stored state of the predictive system.

12. The medium of claim 11, further comprising instructions causing the processor to receive a request to detect a subsequent occurrence of the anomaly.

13. The medium of claim 12, further comprising instructions causing the processor to monitor the predictive system to detect of the stored state of the predictive system associated with the anomaly at a third time subsequent to the second time responsive to receiving the request.

14. The medium of claim 13, further comprising detecting an occurrence of an event associated with the anomaly responsive to detecting the occurrence of the stored state of the predictive system associated with the anomaly.

15. The medium of claim 12, wherein the anomaly is determined by comparing-accuracy of predicted values or states corresponding to predictive outputs over a first time period including the first time relative to actual values or states over a second time period including the second time.

16. The medium of claim 11, wherein the predictive system is configured to learn and detect temporal sequences of spatial patterns in the input data by activating or deactivating the cells.

17. The medium of claim 11, wherein instructions for generating the prediction output comprises instructions causing the processor to:
    generate a series of spatial pooler outputs in sparse distributed representation by processing the input data over time by a spatial pooler, each of the spatial pooler outputs indicating a spatial pattern detected in the input data at a time; and
    generate, by a sequence processor, the prediction output by at least activating or deactivating the cells to represent stored temporal relationships between the series of spatial pooler outputs.

18. The medium of claim 17, wherein the prior state and the updated state of the predictive system comprises states of the cells in the sequence processor.

19. The medium of claim 17, wherein instructions to determine the anomaly comprises instructions causing the processor to compare the prediction output at the first time with the spatial pooler output at the second time.

20. The medium of claim 11, wherein instructions to detect the anomaly comprises instructions causing the processor to determine whether the predicted value or state deviates from the actual value or state above at the second time beyond a threshold difference.

21. A computing system, comprising:
   a processor;
   a predicting system configured to:
      change from a prior state to an updated state according to an input data received at a first time by at least activating or deactivating cells of the predictive system, the prior state of the predictive system indicating at least activation states of the cells before receiving the input data at the first time, the updated state of the predictive system indicating at least the activation states of the cells after receiving the input data at the first time; and
      generate a prediction output by the predictive system by at least detecting the cells that are activated after receiving the input data at the first time, the prediction output representing a predicted value or state at a second time subsequent to the first time; and
   an anomaly detector configured to:
      store at least the updated state of the predictive system;
      determine presence of an anomaly associated with the input data by at least comparing the predicted value or state corresponding to the predictive output with an actual value or state at the second time; and
      associate the anomaly with the stored state of the predictive system.

* * * * *